(12) United States Patent
Shin et al.

(10) Patent No.: US 6,388,993 B1
(45) Date of Patent: May 14, 2002

(54) ATM SWITCH AND A METHOD FOR DETERMINING BUFFER THRESHOLD

(75) Inventors: Jae-Jin Shin, Kwangmyong; Kyung-Geun Lee, Sungnam; Dan-Keun Sung; Jeong-Won Heo, both of Daejon; Sung-Hyuk Byun, Siheung; Ju-Yong Lee, Daegoo; Jin-Woo Yang, Busan, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/095,744

(22) Filed: Jun. 11, 1998

(30) Foreign Application Priority Data

Jun. 11, 1997 (KR) ............................................ 97-24144

(51) Int. Cl.$^7$ ................................................ G06F 11/00
(52) U.S. Cl. ........................ 370/233; 370/412; 370/418; 370/236
(58) Field of Search ................................. 370/229, 230, 370/235, 236, 395, 412, 418, 231, 232, 233, 234, 468, 395.2, 395.41

(56) References Cited

U.S. PATENT DOCUMENTS

| | | | |
|---|---|---|---|
| 5,367,520 A | * 11/1994 | Cordell | ........................ 370/395 |
| 5,440,547 A | 8/1995 | Easki et al. | |
| 5,453,980 A | 9/1995 | Van Engelshoven | |
| 5,455,820 A | * 10/1995 | Yamada | ........................ 370/413 |
| 5,521,923 A | 5/1996 | Willmann et al. | |
| 5,530,806 A | 6/1996 | Condon et al. | |
| 5,570,348 A | 10/1996 | Holden | |
| 5,583,858 A | * 12/1996 | Hanaoka | ........................ 370/392 |
| 5,583,861 A | * 12/1996 | Holden | ........................ 370/395 |
| 5,704,047 A | 12/1997 | Schneeberger | |
| 6,219,728 B1 | * 4/2001 | Yin | ................................ 710/52 |

\* cited by examiner

*Primary Examiner*—Chau Nguyen
*Assistant Examiner*—Mehra Pal Inder
(74) *Attorney, Agent, or Firm*—Robert E. Bushnell, Esq.

(57) ABSTRACT

An ATM switch having the buffer threshold controller to control the cell input into the switching element using the back-pressure signal and a method for determining the buffer threshold according to the buffer threshold controller are disclosed. The ATM switch includes buffer pool storing the cell input to the switch; buffer pool control part storing the buffer pool occupancy information per input port of the buffer pool; threshold control part receiving the buffer pool occupancy information from the buffer pool control part and calculating the threshold per input port periodically and then sending it to the buffer pool control part; input crosspoint control part controlling the cells input to the buffer pool by receiving the control signal from the buffer pool control part; and output crosspoint control part controlling the cells output from the buffer pool by receiving the control signal from the buffer pool control part. The method includes the steps of calculating $r_i$, the buffer pool occupancy rate of the ith input port (i=1, 2, 3, ..., N); calculating $r_{ti}$, the threshold of the buffer pool occupancy rate of the ith input port; calculating $L_i$, the number of occupation of the cells in the buffer pool of the ith input port; calculating the difference, $D_{order(k)} = t_j - L_j (k=1, 2, 3, N ..., N)$ between $t_j$, the threshold of the jth input port and $L_j$, the number of cells stored in the buffer pool, where i≠j (j=1, 2, 3, . . . , N); calculating $t_{D\_order(k)}$, the threshold in case where the $t_j - L_j$ is the kth value in descending order from the N input ports; calculating $b_{D\_order(k)}$, minimum threshold to guarantee the minimum cell input; and comparing Δ, the minimum unit of increase or decrease of the threshold and the value of $t_{D\_order(k)} - b_{D\_order(k)}$.

7 Claims, 6 Drawing Sheets

ATM SWITCH AND A METHOD FOR DETERMINING BUFFER THRESHOLD

CLAIM OF PRIORITY

This application makes reference to, incorporates the same herein, and claims all benefits accruing under 35 U.S.C §119 from an application entitled An ATM Switch And A Method For Determining Buffer Threshold earlier filed in the Korean Industrial Property Office on Jun. 11, 1997, and there duly assigned Ser. No. 97-24144 by that Office.

1. Field of the Invention

The present invention for the ATM switch of Input Buffering type using the back-pressure signal, relates to a buffer threshold controller controlling the threshold per input port of switch element, using cell buffer occupancy information stored in the buffer pool of the switch element. More particularly, the present invention is intended to provide an ATM switch comprising the buffer threshold controller to improve the throughput of cells transmitted to the input port by changing the threshold dynamically at regular conversion time for cell time, wherein the threshold is the criterion to make occurrence of back-pressure signal according to the distribution of cells inputted to each input port and to provide a method for determining the buffer threshold.

2. Description of the Related Art

With the increasing needs for large transfer capacity and high speed transmission of digital data communication network systems, such as the broadband integrated services digital network (BISDN), the development of a more efficient data-transfer routing scheme for such network systems has been in demand. In recent years, as one of the BISDN systems satisfying the requirements, attention is paid to a specific digital data network system that employs a specific packet-oriented data-transfer mode which uses asynchronous time division multiplexing techniques, which is called the asynchronous transfer mode (ATM). ATM is a dedicated-connection switching technology that organizes digital data into 53 byte cells, or packets, and transmits them over a medium using digital signal technology. Individually, a cell is processed asynchronously relative to other related cells and is queued before being multiplexed over the line. Along with SONET (Synchronous Optical Network) and several other technologies, ATM is a key component of BISDN.

The details of the data transmission principles in the ATM communication network system have been described in several recommendations as published by the international telegraph and telephone consultative committee (CCITT).

More specifically, with the ATM network, the multiplexed information flow to be communicated between the sender and receiver terminals is organized into a plurality of cells of fixed size. In ATM switching facilities it is frequently necessary to switch data cells from several input lines to one and the same output line. This is one of the reasons why data cells are temporarily stored before, during, or after the switching process. The temporary storage may be in the form of several parallel queues. The queues are treated by a priority relationship known as priority classes, so that the data cells are served differently according to which queue they belong to.

An ATM switch distinguishes itself from a circuit switch in that it must reconfigure itself essentially every cell period. Furthermore, it must deal with a cell stream from each of its input ports wherein each cell may be destined for a different output port. This leads to contention among cells for output ports, since it is entirely possible for cells from two input ports to be destined for the same output port at the same time. This implies the need for storage somewhere in the switch so that all cells can eventually reach their intended output port.

In many architectures, contention that occurs for an output port means that some portion of the switch is idle while a cell waits, implying degradation in the throughput of the switch. Because of the statistical nature of the arrivals of cells at the input ports and of the destinations, there usually exists some probability of cell loss, which must be minimized. Finally, even if there is no cell loss, periods of considerable contention lead to large numbers of cells being instructed to wait somewhere in the storage media of the switch, implying long delays through the switch for some cells some of the time, leading to variations in transport delay or cell jitter. The following references, incorporated by reference, describe some known ATM system architectures: U.S. Pat. No. 5,367,520 to Robert R. Cordell entitled Method And System For Routing Cells In An ATM Switch; U.S. Pat. No. 5,440,547 to Hiroshi Easki et al. entitled Data-Transfer Routing Management For Packet-Oriented Digital Communication System Including ATM Networks; U.S. Pat. No. 5,453,980 to Robertus J. Van Engelshoven entitled Communication Network And Computer Network Server And INterface Modules Used Therein; U.S. Pat. No. 5,521,923 to Gert Willmann et al. entitled Method And Facility For Temporarily Storing Data Packets, And Exchange With Such Facility; U.S. Pat. No. 5,530,806 to Joseph H. Condon et al. entitled Method And Apparatus For Storing And Retrieving Routing Information In A Network Node; U.S. Pat. No. 5,570,348 to Brian D. Holden entitled Method And Apparatus For Enqueueing Data Cells In An ATM Switch Fabric Architecture; U.S. Pat. No. 5,583,861 to Brian D. Holden entitled ATM Switching Element And Method Having Independently Accessible Cell Memories; and U.S. Pat. No. 5,704,047 to Stefan Schneeberger entitled ATM Communication System Wherein Upstream Switching Element Stops The Transmission Of Message For A Predetermined Period Of Time Upon Backpressure Signal.

In view of the foregoing references, a simple ATM switch can be constructed by preceding a crosspoint array with a FIFO (first-in-first-out) input buffer on each of its input ports. A contention resolution device then examines all of the output port requests, comparing them against one another, and decides which FIFOs may empty a cell into the switch core, permitting only one cell to be routed to any given output port. Cells that contend and lose will get a chance to leave their FIFO during the next cell period. If none of these input buffers overflows, then there will be no cell loss. A losing contender at the head of one of these queues or lines forces all cells behind it to wait, even if they are destined for an output port that is free.

This type of architecture is called an input buffered switch. A system architecture of an N×N input buffer switching system using a method of input buffering includes a routing table element attaching a routing tag to an ATM input cell using the information of the output port, an input buffer storing the cells being input and a switching fabric having a cell-transmission function between an input port and an output port using the routing tag. A routing table element and an input buffer are required, at a one to one relationship, for every input port and the switching fabric may be comprised of a unit switch or several unit switches.

The cells being input to the switching system, above all, are sent to routing table element, and the routing table element directs the storage of the input cell to the appropriate logical queue within the input buffer according to the class of the input cell. In the switch system, the input buffer is split into a plurality of logical queues to support a plurality of priorities.

The method for transmitting a cell in the logical queues to the routing table element is such that the method checks first in the logical queues if a cell is stored from the logical queue having the highest priority one after another. If there is a cell to be transmitted in the logical queue that has been checked, it checks if there is a back-pressure signal corresponding to the checked logical queue.

The switch fabric has a table that stores the priority of the cell, which is in the shared buffer, and the number of each of the priority cells for each input port. If the cells having the same priorities are transmitted to the same input ports, a collision may happen between the cells having the same priorities and the same input ports. So, a back-pressure signal is used to prevent such a collision.

In a case where the back-pressure signal does not exist, the cell is read from the input buffer and transmitted to the switch fabric through the routing table element. And in a case where the back-pressure signal exists, the method checks if there is a cell that is stored for the logical queue of the next priority and if there is a back-pressure signal corresponding to the logical queue. Namely, the method checks if there is a cell in the logical queue, and if there is not a back-pressure signal, transmits the cell through the switch fabric. Until an input cell is read from the input buffer, the method checks the logical queues and transmits the cell through the input port.

The static allocation for logical queue size has a disadvantage in that it can not accept variations in the dynamic traffic, smoothly.

For example, in case where the cells having a number of priorities are input with equal distribution and the same depths are allocated for each priority buffer, if a large number of cells with a specific priority are input, then empty areas may occur in the logical queues having other priorities and a large number of cell losses occur in the logical queues having the specific priorities are input as the buffers are insufficient.

Namely, in the prior method, the input buffer depth has a fixed allocation area statically. Therefore, if the input traffics are changed quite a bit, compared with the input traffics when the depth of the input buffer is defined, a relatively large cell loss may occur.

A known ATM switching system architecture of a switch fabric-type is built of a plurality of ATM switch element circuits and routing table circuits for each physical connection to/from the switch fabric. A shared pool of memory is employed to eliminate the need to provide memory at every crosspoint.

The back-pressure signal is sent to the routing table through the corresponding input port when the number of the cells included in the class of the specific priority, which are transmitted to the specific input port, is greater than a predetermined threshold per priority, and when the number of all cells stored in the unit switch is greater than the total threshold. For example, in case where the predetermined threshold is 2 and total threshold of the buffer pool is 24, if the number of cells included in the specific priority class in the buffer pool of the unit switch element is up to 2 or more, the back-pressure signal is transmitted so as to prevent the specific priority cell from being transmitted only to the corresponding input port and if total number of cells in the buffer pool is up to 24 or more, the back-pressure signals are transmitted to all input ports.

In the conventional way, the back-pressure signal has been generated using the threshold of the same classes for all input ports of the switching element. When the distribution of the cells input to each input port is same, it is called a uniform traffic environment. In this environment, the drop in throughput of the switching system does not occur in the conventional way, but in the practical environments, a case such that the cells are clustered to the specific port of the input port rather than the uniform traffic may occur. It is called a non-uniform traffic environment or hot-spot. In this case, although there is a receiving capacity of cells in the buffer pool, the back-pressure signals for the cells are transmitted to the input port side when a large number of cells are input to the specific input port, so more cells can not be transmitted and the throughput of the switching system becomes low.

As stated above, in the practical ATM switching system, the distribution of the cell inputted is generally not uniform traffic environment but hot-spot traffic environment. When using the conventional method of determining the threshold in such a ATM switching system, the back-pressure signal of the cell inputted to the specific input port occurs frequently, so the drop in throughput of cells is indispensable in general.

SUMMARY OF THE INVENTION

The present invention is intended to solve the problem as stated above and the invention has an object to provide an ATM switch comprising a buffer threshold controller to improve the throughput of cells from the non-uniform input traffics by dynamically allocating the threshold for each port at regular time intervals using the storage information of cells per input port for the cells stored in the switch and using the threshold information determined per input port and to provide a method for determining the buffer threshold.

The other object of the present invention is to improve the cell throughput by dynamically changing the threshold of each input port at regular cell time of conversion time interval, W, using the storage information of cells stored in the buffer pool per input port in the ATM switching system.

The present invention discloses an ATM switch comprising the buffer threshold controller to control the cell input into the switching element using the back-pressure signal and a method for determining the buffer threshold.

The ATM switch includes buffer pool storing the cell input to the switch; buffer pool control part storing the buffer pool occupancy information per input port of the buffer pool; threshold control part receiving the buffer pool occupancy information from the buffer pool control part and calculating the threshold per input port periodically and then sending it to the buffer pool control part; input crosspoint control part controlling the cells input to the buffer pool by receiving the control signal from the buffer pool control part; and output crosspoint control part controlling the cells being output from the buffer pool by receiving the control signal from the buffer pool control part.

According to one embodiment of the present invention, it is preferable that the ATM switch improves the throughput in the way that calculates the threshold based on an algorithm for determining the threshold size by using the buffer pool occupancy information sent from the buffer pool control part and makes the back-pressure signal by sending the calculated threshold size signal to the buffer pool control part.

And the present invention discloses a method for determining the buffer threshold size in the buffer threshold controller of the ATM switch that controls the cell input to the switching element using the back-pressure signal.

Other objects and advantages of the invention will become apparent upon reading the following detailed descriptions and upon reference to the drawing.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
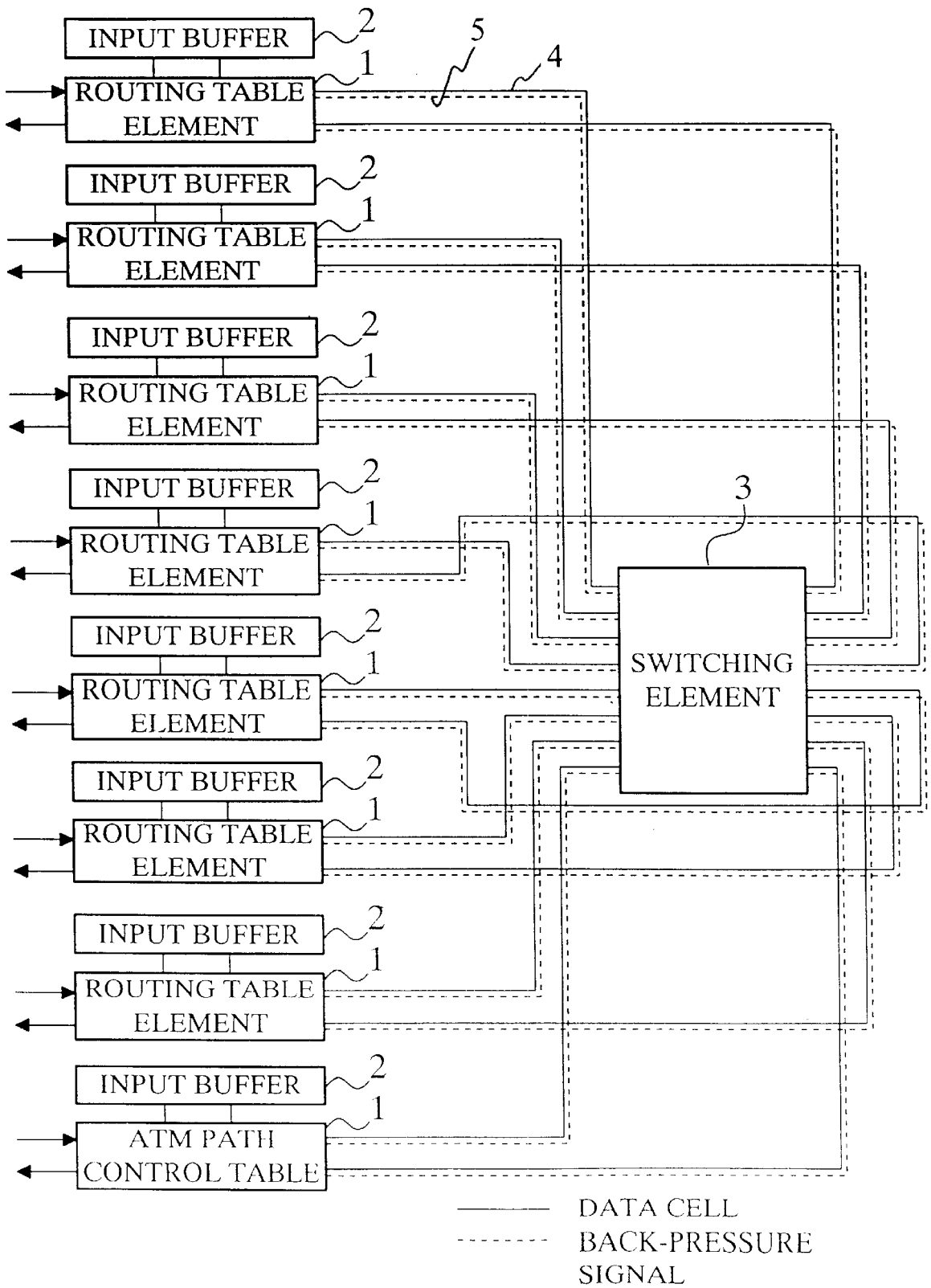
FIG. 1 illustrates an architecture of N×N ATM switching system.

FIG. 1 illustrates a basic system architecture of N×N input buffer switching system using a method of input buffering. The switching system includes a routing table element (1) attaching a routing tag to an ATM input cell using the information of the output port, an input buffer (2) storing the cells being input and a switching element (3) having a cell-transmission function between an input port and an output port using the routing tag. A routing table element (1) and an input buffer (2) are required, at a one to one relation, for every input port and the switching fabric may be comprised of a unit switch or several unit switches.

The cells being input to the switching system, above all, are sent to routing table element (1), and routing table element (1) directs the storage of the input cell to the appropriate logical queue within input buffer (2) according to the class of the input cell. In the switch system, input buffer (2) is split into P logical queues to support P priorities. The logical queue depth corresponding to each priority is determined in routing table element (1). The cell stored as stated above is read from each logical queue in the method of FIFO (first-in-first-out) according to the priority and transmitted to routing table element (1). By using output port information of the cell transmitted to routing table element (1), the path information of switching element (3) is made and a tag is attached to the cell so that a path of the cell to be switched in said switch fabric is pre-determined, The cell having the attached tag is transmitted to the output port through the switch fabric.

The method for transmitting a cell in the P logical queues to routing table element (1) is such that the method checks first in the P logical queues if a cell is stored from the logical queue having the highest priority one after another. If there is a cell to be transmitted in the logical queue that has been checked, it checks if there is a back-pressure signal corresponding to the checked logical queue.

Switching element (3) has a table that stores the priority of the cell, which is in the shared buffer, and the number of each of the priority cells for each input port. If the cells having the same priorities are transmitted to the same input ports, a collision may happen between the cells having the same priorities and the same input ports. So, a back-pressure signal is used to prevent such a collision.

In a case where the back-pressure signal does not exist, the cell is read from input buffer (2) and transmitted to switching element (3) through routing table element (1). And in a case where the back-pressure signal exists, the method checks if there is a cell that is stored for the logical queue of the next priority and if there is a back-pressure signal corresponding to the logical queue. Namely, the method checks if there is a cell in the logical queue, and if there is not a back-pressure signal, transmits the cell through switching element (3). Until an input cell is read from input buffer (2), the method checks the P logical queues and transmits the cell through the input port.

In FIG. 1, a solid line (4) between switching element (3) and routing table element (1) represents the transmission of a data cell from input buffer (2) to switching element (3). The cell is transmitted to the output port of switching element (3) through the input port of switching element (3). A dotted line (5) represents the back-pressure signal that is transmitted from the input port of switching element (3) to the output port side of routing table element (1). When the back-pressure signal for the checked input buffer (2) does not exist, the cell is read from input buffer (2) and transmitted to switching element (3) through the routing table element (1). And when the back-pressure signal exists, the cell, which exists in the input buffer, is not transmitted to the switching element (3) side and the procedure checks if there is a cell that is stored for the logical queue of the next priority and if there is a back-pressure signal corresponding to the logical queue. Namely, the procedure checks if there is a cell in the logical queue and if there is not a back-pressure signal, and then it transmits the cell through the switch element (3) only if the two conditions are satisfied. Until an input cell is read from the input buffer (2), it checks the P logical queues and transmits the cell through the input port.

Figure 2:
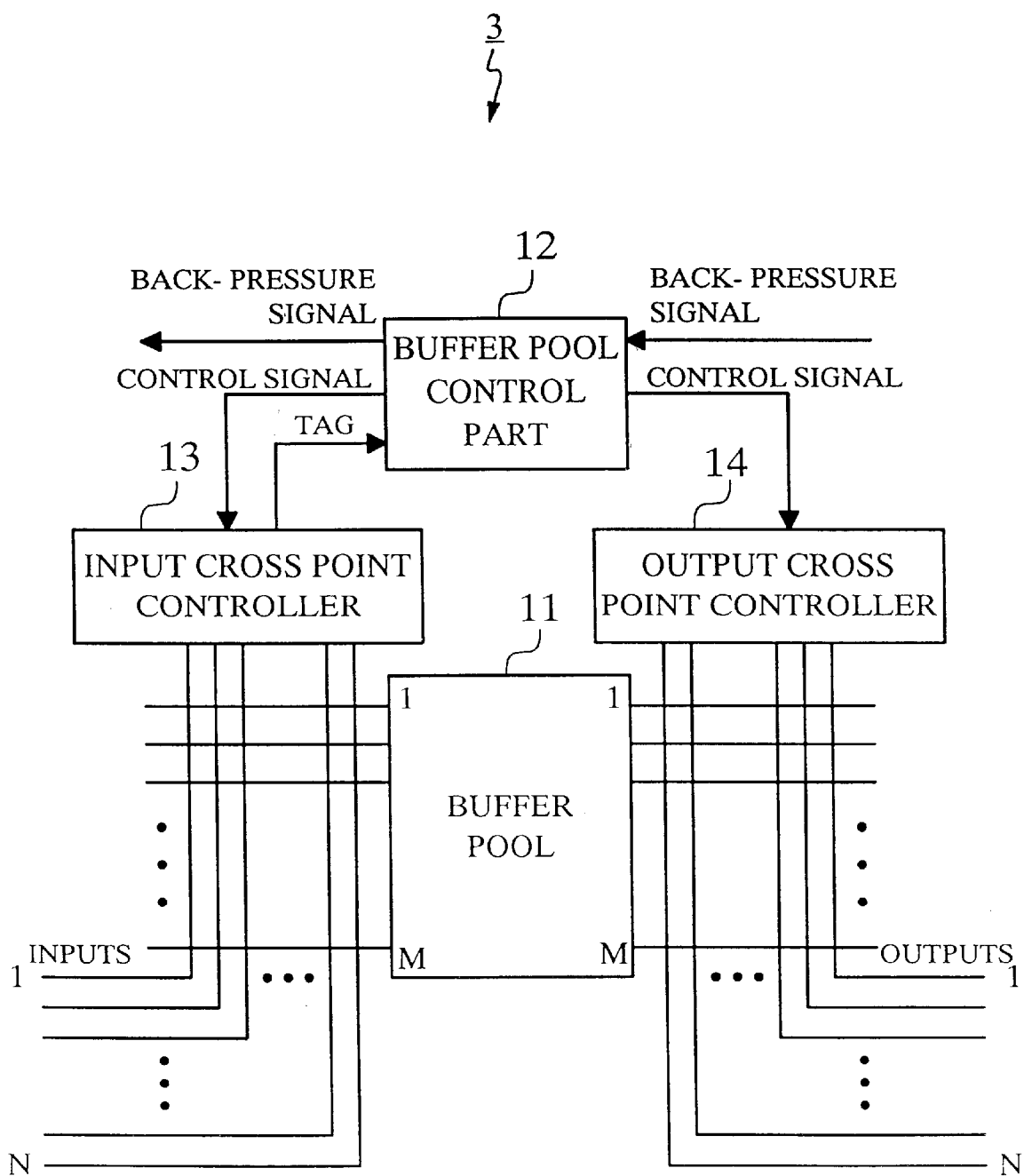
FIG. 2 illustrates an architecture of N×N ATM switching element.

FIG. 2 illustrates an architecture of N×N ATM switching element 3. The switching element includes a buffer pool (11) storing the cells, an input crosspoint controller (13) controlling the cell input, an output crosspoint controller (14) and a buffer pool control part (12) controlling the input/output devices.

The cells input to the switch are stored in buffer pool 11 in the switching element through the input crosspoint controller (13), and at this time, the input crosspoint controller (13) reads the tag of the cell and transmits it to the buffer pool control part (12). Whenever the cell is stored in the buffer pool (11), the buffer pool control part (12) receives the tag of the cell and the storing place of the cell and updates the information for the number of cells stored in the buffer pool (11). The cells stored in the buffer pool (11) are transmitted to the desired output port through output crosspoint controller (14), and output crosspoint controller (14) responds to the control signal of the buffer pool control part (12). By using the cell input/output information, the buffer pool (12) may generate a back-pressure signal and transmits it to the routing table element (1) and also stops the cell output to the output port if the back-pressure signal transmitted from the rear side exists.

Figure 3:
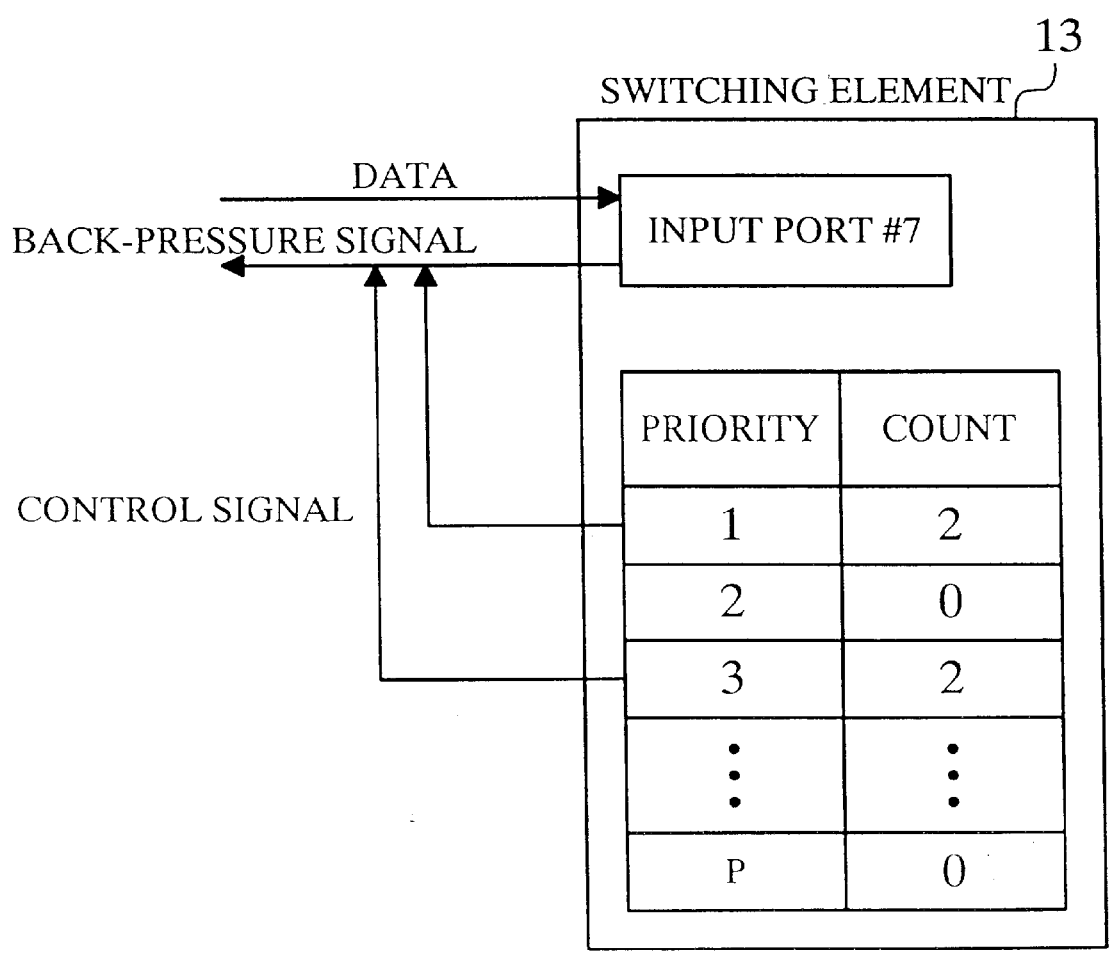
FIG. 3 shows a structure illustrating a procedure for generating of a back-pressure signal.

FIG. 3 illustrates an algorithm for generating the back-pressure signal and the unit switching element has a table containing information on how many cells for each priority class per each input port are stored in the buffer pool (11). In FIG. 3, the content of the table shows the number of the cells stored per priority class for input port 7. Two cells included in the class of priority 1 and two cells included in the class of priority 3 are stored. Assuming that the threshold of each class is 2, the back-pressure signal is transmitted to the front side so as to prevent the cells included in the class of priority 1 and the class of priority 3 from being transmitted to the input port 7.

The back-pressure signal is sent to the routing table through the corresponding input port when the number of the cells included in the class of the specific priority, which are transmitted to the specific input port, is greater than c, the threshold per priority, and when the number of all cells stored in the unit switch is greater than the total threshold. For example, in case where c is 2 and total threshold of the buffer pool is 24, if the number of cells included in the specific priority class in the buffer pool (11) of the unit switch element is up to 2 or more, the back-pressure signal is transmitted so as to prevent the specific priority cell from being transmitted only to the corresponding input port and if total number of cells in the buffer pool (11) is up to 24 or more, the back-pressure signals are transmitted to all input ports.

The present invention include a buffer threshold control part that determines the thresholds of input ports at regular cell time of an input port threshold conversion time interval, W, using the buffer pool occupancy information from the buffer pool controller in the switching system to improve the cell throughput for the cell input in the switching system.

Figure 4:
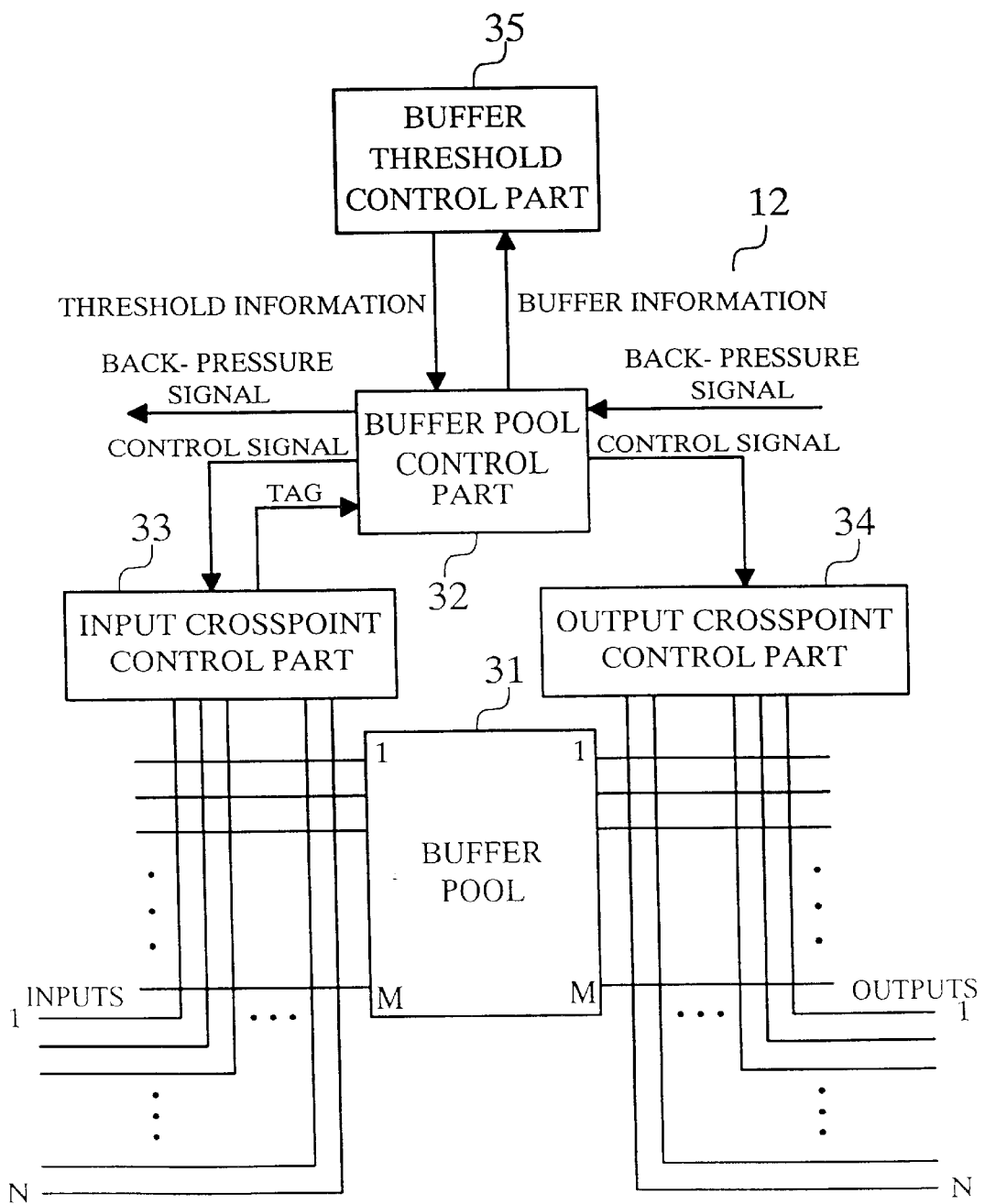
FIG. 4 illustrates an architecture of the switching element in the ATM switch according to the present invention.
Figure 5:
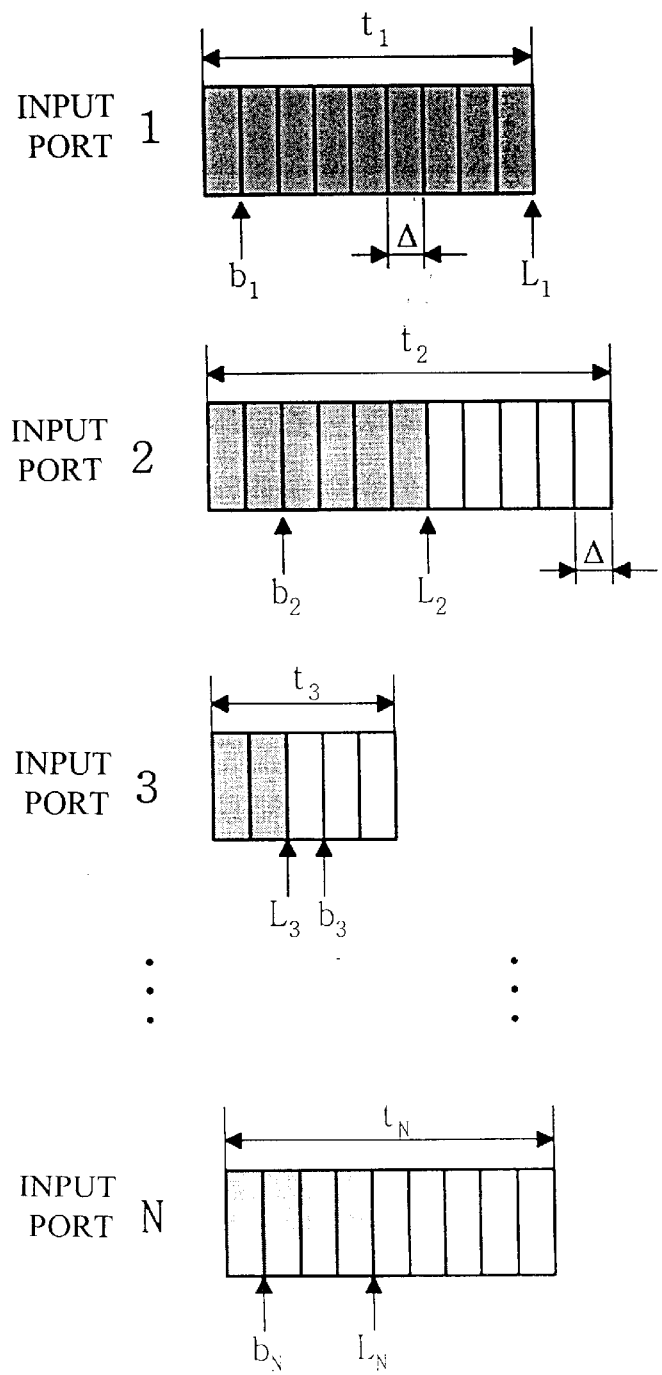
FIG. 5 illustrates a method of determining the buffer threshold according to the present invention.

Referring to FIG. 4 and FIG. 5, the present invention is described as follows. An ATM switch includes buffer pool control part (32), input crosspoint control part (33), output crosspoint control part (34), buffer pool (31) and buffer threshold control part (35). The buffer threshold control part (35) receives the buffer pool occupancy information from the buffer pool control part (32) and calculates the buffer pool occupancy ratio per input port, and calculates the threshold at regular cell time of threshold conversion time interval, W, using the buffer pool occupancy information and the buffer pool occupancy ratio and transmits it to the buffer pool control part (32). Then, buffer pool control part (32) generates the control signal to change the threshold for each priority class buffer.

The buffer threshold control part (35) according to the present invention calculates the threshold per input port at regular cell time of threshold conversion time interval, W, based on the following algorithm for determining the threshold size by using the buffer pool occupancy information received from the buffer pool control part (32) and the buffer pool occupancy ratio calculated using the buffer pool occupancy information per input port and the present threshold information.

The algorithm for determining the threshold calculates the buffer pool occupancy ratio of the buffer pool of the ith priority class using the number of cell occupancy of the buffer pool of the ith priority class, received from the buffer pool control part (32). For example, assumed that the number of cells stored in the buffer pool of the ith priority is $L_i$, and the total number of cell occupancy of all buffer pools is $$L_{total} = \sum_{i=1}^{N} L_i,$$

the buffer pool occupancy ratio of the ith input port, $r_i$ is as following expression.

$$r_i = \frac{L_i}{L_{total}}$$

FIG. 5 illustrates the relation between the threshold per input port and the information of the number of buffer pool occupancy to describe the algorithm for determining the threshold size according to the present invention. A switch element has N input port occupancy tables in the buffer pool control part to store the occupancy information of N input ports. The input port occupancy table for the ith input port includes $L_i$, the number of cells input through the ith input port out of cells stored in the buffer pool. When the cells in the buffer pool is equal to the threshold, $t_i$ ($L_i=t_i$), the back-pressure signal is generated and cells can be stored through the ith input port to the maximum number of $t_i$. In FIG. 5, $L_1$ is equal to $t_1$ for the input port 1, so the back-pressure signal is transmitted to the front element connected to the input port 1. As a result of the present invention dynamically changing the threshold, $t_i$, the problem such that the throughput is decreased when the hot-spot as the cells are clustered occurs has been solved.

To guarantee the minimum cell input for each input port, the threshold is limited not to be less than the minimum threshold, $b_i$. Threshold $b_i$ is a value assigned statically and $t_i$ is a variable that can be changed at regular cell time intervals, W, for determining the threshold size based on Δ, the minimum unit of increase or decrease of the threshold which is at least equal to one cell size.

The buffer threshold control part calculates the threshold size per port at regular cell time interval W for conversion of the threshold size. It can be assumed as the hot-spot when $r_i$, the buffer pool occupancy rate of the ith input port, is greater than $r_{th}$, a predetermined threshold of occupancy rate, and the practical occupancy number has already reached the threshold $t_i$. In this case, to increase the threshold of the ith input port to the extent of Δ cell, the threshold of the jth input port having the, least number of cells practically stored, compared to the threshold size, i.e., the threshold of the input port having the largest value of $t_j-L_j$ from other input ports is reduced to the extent of Δ cell and the value of Δ cell is added to the threshold of the ith input port. That is to improve the throughput of input cells in the switching system, the threshold of the input port having a high buffer pool occupancy rate in the switching element and being in the state of hot-spot such that the number of occupancy reaches the threshold is increased and the threshold of the input port having a low buffer pool occupancy rate relatively to other input ports is decreased.

Figure 6:
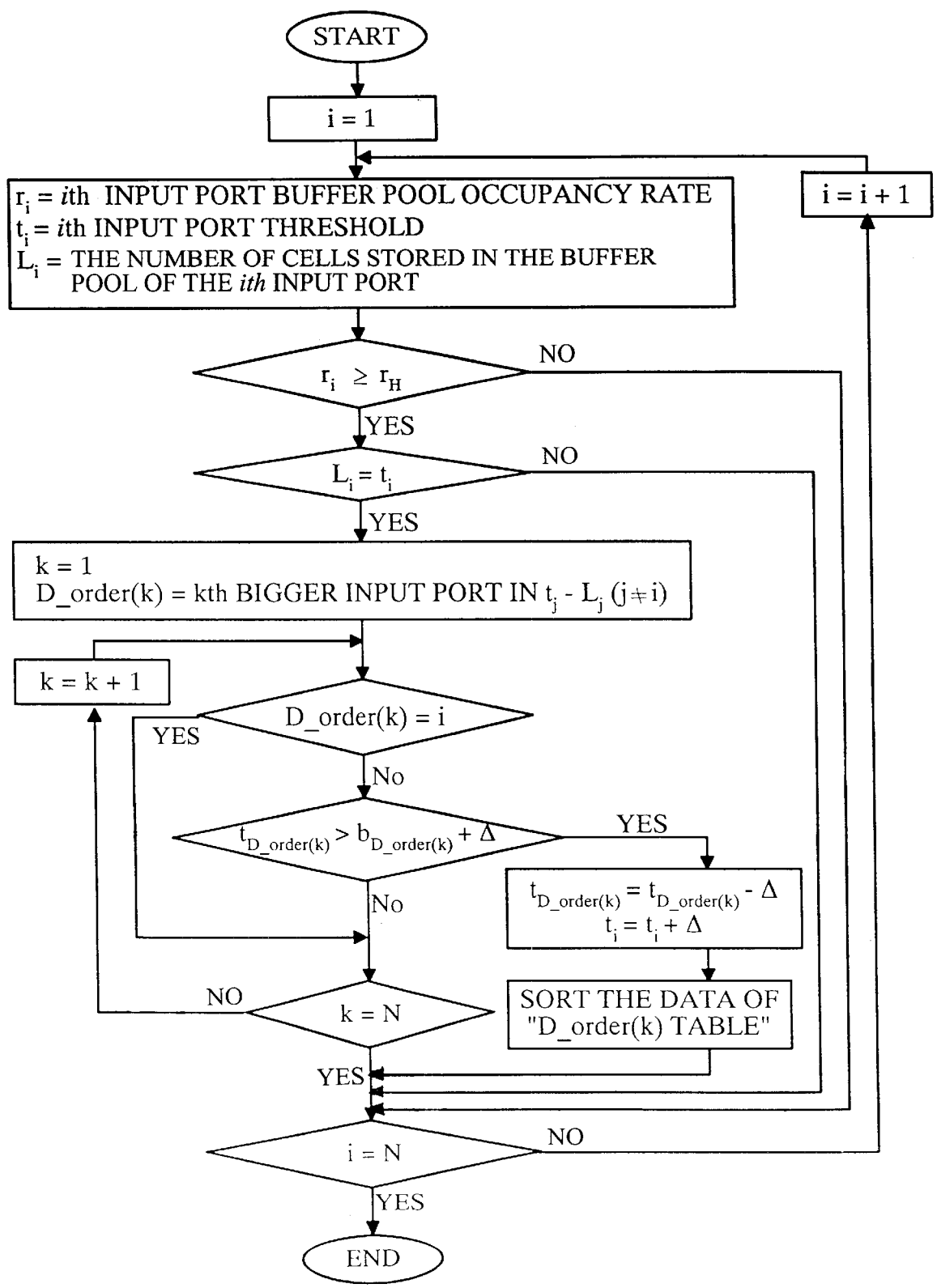
FIG. 6 illustrates a flow chart showing the method of determining the buffer threshold aid according to the present invention.

FIG. 6 is a flow chart illustrating the algorithm for determining the threshold size of the threshold control part in the present invention. In the flow chart, $r_i$ indicates the buffer pool occupancy rate of the ith input port, $L_i$ indicates the number of cells stored in the buffer pool of the ith input port and $t_i$ indicates the threshold of the ith input port. The buffer threshold control part determines the threshold $t_i$ (i=1, 2, . . . , N) for each input port, wherein there are N input ports, at regular cell time of conversion time interval for threshold size, W, using the algorithm for determining the threshold size as illustrated in FIG. 6.

First, it is checked whether $r_i$, the buffer pool occupancy rate of the specific ith input port is greater than $r_{th}$, the threshold of occupancy rate, whether $L_i$, the number of cells stored in the buffer pool of the ith input port is greater than $t_i$, the threshold of the input port. If they are all greater than the two thresholds, it is checked whether the threshold, ti can be changed. Otherwise, the threshold of the input port is checked for the next port, the i+1th input port.

To increase the threshold of the specific input port to the extent of $\Delta$ cell, first the threshold of another of other input ports has to be decreased to the extent of $\Delta$ cell. Therefore, first of all, it is checked whether the threshold of another input port can be reduced. For the above, it is checked whether the threshold can be reduced in descending order of the value of $t_j-L_j (j \neq i)$ for the other N−1 input ports except the ith input port.

In FIG. 6, "$D_{13}$ order(k)" indicates the input port wherein the value of $t_j-L_j$ is as large as the kth order. For example, "D_order(2)" represents the input port wherein the value of $t_j-L_j$ is the second large ($j \neq i$) in all input ports.

Then, from the present "D_order(1)" input port, it is checked whether the present threshold ($t_{D\_order(1)}$) is greater than the minimum threshold ($b_{D\_order(1)}$) increased to the extent of $\Delta$, the unit for assignment of the minimum threshold, i.e., it is determined whether $(t_{D\_order(1)}) > (b_{D\_order(1)}) + \Delta$. If the condition is satisfied, the threshold of the "D_order(1)" input port is decreased to the extent of $\Delta$ cell and the threshold of the ith input port is increased to the extent of $\Delta$ cell. If the condition is not satisfied, the checking is performed by changing k continuously and if the input port satisfying the condition is found or if it has been checked out to the "$D_{13}$ order(N)" input port having the least value of $t_j-L_j (j \neq i)$, the process for performing the algorithm for determining the threshold size is finished. And whenever the threshold of the input port is changed, the value of $t_j-L_j (j \neq i)$ is changed. So the table including the "D_order (k)" information should be sorted necessarily once again since the threshold is modified.

As stated above, after determining the threshold of the ith input port, the threshold of the i+1th input port is determined through the same steps. Here, the size of cell time of the time interval for determining the threshold size, W, the minimum threshold, $b_i$, the minimum unit for assigning the threshold, $\Delta$, and the threshold of buffer pool occupancy rate of the input port, $r_{th}$, etc., are determined considering the characteristics of the switching system, the number of input ports and the estimated distribution of input traffics.

The buffer threshold control part determines the threshold of each input port at regular cell time of the threshold conversion time interval, W and transmits it to the buffer pool control part. And the buffer pool control part generates the back-pressure signal per input port using it and then transmits to the front side. The buffer threshold control part can be positioned in the buffer pool control part or can be positioned separately with the buffer pool control part. The buffer threshold control part according to the present invention is considered as a case that it is positioned separately with the buffer pool control part.

In the present invention, a buffer threshold control part is added to the switching system, wherein the buffer threshold control part controls the threshold per input port in the switching element using the buffer pool occupancy information per input port. The buffer threshold control part changes the threshold generating the back-pressure signal dynamically, using the occupancy information of the cells exist in the buffer pool of the input port and then reduces the frequency in occurrence of thresholds. As a result of the present invention, it can get the higher throughput of the switching system, compared to the switching system using the conventional static threshold.

What is claimed is:

1. An asynchronous transfer mode (ATM) switch for controlling cell input into a switching element using a back-pressure signal comprising:

a buffer pool for storing cells input to the switch;

a buffer pool control part for storing buffer pool occupancy information per input port of the buffer pool;

a threshold control part receiving the buffer pool occupancy information from said buffer pool control part and calculating a threshold per input port periodically and then sending information regarding said threshold to said buffer pool control part;

said buffer pool control part increasing a threshold value of an input port having a high buffer pool occupancy rate and decreasing a threshold value of an input port having a low buffer pool occupancy rate relatively to buffer pool occupancy rate of the rest of the input ports;

an input crosspoint control part controlling the cells input to said buffer pool by receiving a control signal from said buffer pool control part based on threshold values of the input ports; and an output crosspoint control part controlling the cells output from said buffer pool by receiving the control signal from said buffer pool control part.

2. An ATM switch according to claim 1, wherein said ATM switch improves the throughput in the way that calculates the threshold based on an algorithm for determining the threshold size by using the buffer pool occupancy information sent from said buffer pool control part and generates a back-pressure signal by sending the calculated threshold size signal to said buffer pool control part.

3. A method for determining buffer threshold size in an asynchronous transfer mode (ATM) switch for controlling cells input into a switching element using aback-pressure signal, said method comprising the steps of:

calculating $r_i$, a buffer pool occupancy rate of an ith input port (i=1, 2, 3, . . . , N);

calculating $r_{ti}$, a threshold of the buffer pool occupancy rate of the ith input port;

calculating $L_i$, a number of occupation of the cells in a buffer pool of the ith input port;

calculating a difference, $D_{order(k)} = t_j - L_j (k=1, 2, 3, . . . , N)$ between $t_j$, a threshold of a jth input port and $L_j$, a number of cells stored in a buffer pool of the jth input port, where $i \neq j$ (j=1, 2, 3, . . . , N);

calculating $t_{D\_order(k)}$, a threshold when said $t_j - L_j$ is the kth value in descending order from the N input ports;

calculating $b_{D\_order(k)}$, a minimum threshold to guarantee minimum cell input;

comparing $\Delta$, the minimum unit of increase or decrease of the threshold and the value of $t_{D\_order(k)} - b_{D\_order(k)}$; and reducing the threshold of the input port having the largest value of $t_j - L_j$ by $\Delta$ and increasing the threshold of the ith input port by $\Delta$.

4. A method for determining buffer threshold size according to claim 3, wherein said $r_i$ is calculated by the expression of where $$r_i = \frac{L_i}{L_{total}},$$

$$L_{total} = \sum_{i=1}^{N} L_i.$$

5. A method for determining buffer threshold size according to claim 3, wherein if said $t_{D\_order(k)} - b_{D\_order(k)}$ is greater than said $\Delta$, then $t_{D\_order(k)} = t_{D\_order(k)} - \Delta$ and $t_i = t_i + \Delta$ are performed and the data of the table storing the information of the D_order(k) is sorted.

6. A method for determining buffer threshold size according to claim 5, wherein if said $t_{D\_order(k)} - b_{D\_order(k)}$ is less than or equal to said $\Delta$, the comparison is performed by changing the value of k continuously to find the input port satisfying the condition or the comparison is performed to find the D_order(N) input port having the least value of $t_j - L_j (j \neq i)$, and then the comparison is finished.

7. A method utilizing a buffer threshold control part for determining buffer threshold size in an asynchronous transfer mode (ATM) switch using a back-pressure signal, said ATM switch including a buffer pool control part having N input port occupancy tables to store occupancy information of N input ports, and input crosspoint control part, an output crosspoint control part, and a buffer pool including a predetermined number of priority class buffers connected to a plurality of input ports, said method comprising the steps of:

calculating a buffer pool occupancy ratio per input port;

calculating a threshold, at regular cell time intervals in response to said buffer pool occupancy ratio and buffer pool occupancy information output from said buffer pool control part, for each input port;

transmitting said calculated threshold to said buffer pool control part; and generating a control signal in response to said calculated threshold to change the threshold for each priority class buffer.

\* \* \* \* \*